United States Patent
Martin

(10) Patent No.: US 6,223,613 B1
(45) Date of Patent: May 1, 2001

(54) PRELOAD CONSTANT MESH GEARBOX

(75) Inventor: William Wesley Martin, Kensington (AU)

(73) Assignee: Preload Gearbox Limited, Kensington (AU)

( * ) Notice: Subject to any disclaimer, the term of this patent is extended or adjusted under 35 U.S.C. 154(b) by 0 days.

(21) Appl. No.: 09/381,564

(22) PCT Filed: Mar. 19, 1998

(86) PCT No.: PCT/AU98/00181

§ 371 Date: Sep. 17, 1999

§ 102(e) Date: Sep. 17, 1999

(87) PCT Pub. No.: WO98/41779

PCT Pub. Date: Sep. 24, 1998

(30) Foreign Application Priority Data

Mar. 19, 1997 (AU) .................................................. PO 5708
Oct. 28, 1997 (AU) .................................................. PP 0040
Nov. 5, 1997 (AU) .................................................. PP 0170
Dec. 8, 1997 (AU) .................................................. PP 0779

(51) Int. Cl.$^7$ ..................................................... F16H 3/08
(52) U.S. Cl. ............................. 74/368; 74/361; 192/84.3
(58) Field of Search ........................... 74/371, 368, 363, 74/372, 594.1, 594.2; 475/297, 338, 341; 192/84.3; 280/336, 338, 331

(56) References Cited

U.S. PATENT DOCUMENTS

| 4,716,777 | * | 1/1988 | Hartmann | ................................. | 74/369 |
| 5,537,888 | * | 7/1996 | Pusic | ...................................... | 74/371 |
| 5,611,556 | * | 3/1997 | Davidow | ............................... | 280/236 |
| 5,862,903 | * | 1/1999 | Gruden et al. | ................. | 192/105 BB |
| 5,976,052 | * | 11/1999 | Lenoble | ................................ | 475/297 |

* cited by examiner

*Primary Examiner*—Sherry Estremsky
*Assistant Examiner*—Tisha D. Lewis
(74) *Attorney, Agent, or Firm*—Reising, Ethington, Barnes, Kisselle, Learman & McCulloch, PC

(57) ABSTRACT

An improvement to gear systems, the improved gear system characterized by at least one gear-wheel (42c) provided about a shaft (34), the shaft (34) and the or each gear-wheel (42c) being provided with a actuable engagement therebetween in both rotational and counter-rotational directions (86, 88), such that engagement of the actuable engagement (86, 88) of the or each gear wheel (42c) in both the rotational and counter-rotational directions causes the or each gear-wheel (42c) to rotate in conjunction with the shaft (34) and prevents such from counter-rotating relative to the shaft (34), disengagement of the actuable engagement (86, 88) of the or each gear-wheel (42c) in both the rotational and counter-rotational directions allows the or each gear-wheel (42c) to rotate independently of the shaft (34) and counter-rotate relative to the shaft (34), engagement of the actual engagement (86, 68) in the rotational direction and disengagement of the actual engagement (86, 68) in the counter-rotational direction of the or each gear wheel (42c) causes such to rotate in conjunction with the shaft (34) and allows such to counter rotate relative to the shaft (34), and engagement of the actual engagement (86, 88) in the counter-rotational direction and disengagement of the actual engagement (86, 88) in the rotational direction of the or each gear wheel (42c) allows such to rotate relative to the shaft (34), but prevents such from counter rotating relative to the shaft (34).

25 Claims, 12 Drawing Sheets

PRELOAD CONSTANT MESH GEARBOX

FIELD OF THE INVENTION

The present invention relates to improvements in gear systems. More particularly, the improved gear system of the present invention is intended to, inter alia, allow changing of gears under load without the need for a traditional clutch and with the substantial minimisation of any momentary reduction in power input to the gear system.

DISCUSSION OF THE PRIOR ART

Constant mesh gear boxes generally rely on a means to lack and unlock individual gears with respect to a drive shaft. Unlocking a gear disengages that gear ratio and allows it to rotate freely about the shaft.

Locking a gear with respect to the shaft causes that gear ratio to be engaged. This allows transmission of power from the shaft in respect of which that gear has been locked to another shaft about which a complimentary gear is provided in fixed relation, at that sear ratio. Such gear pairs or ratios are generally in constant mesh aligned along the length of two substantially parallel shafts. One gear pair or ratio is engaged at any one time whilst the remaining gear pairs or ratios rotate freely about the shaft.

Attempts appear from the prior art to have been made at synchronising the timing of the unlocking of one gear with the concurrent locking of the next gear. It seems that this arrangement does not provide a viable solution as existing methods are slow and dependent on cumbersome and expensive means.

The invention disclosed in International Patent Application POT/AU97/00024 (WO 97/26468) discloses a gear system utilising magnetically driven locking and unlocking of gears with respect to parallel shafts but does not disclose the ability to change gears under load.

Changing of gears in prior art manual and sequential gear boxes results in a break in power transmission and lost acceleration time, as it requires disengaging one gear-wheel pair or ratio prior to engaging the next gear-wheeled pair. Prior art automatic transmissions are typically inefficient whilst manual gear-boxes are slow to change between gears.

The improvement to gear systems of the present invention has as one object thereof to substantially overcome the above-mentioned problems associated with the prior art. For example, to change gears successfully under load requires an engagement of the next gear whilst the presently engaged gear remains engaged also. The locking of the newly engaged gear is not then exposed to such an impact as the previous gear is already bearing the load. The newly engaged gear then assumes the load from the previous gear allowing that previous gear to unlock freely from its shaft.

Throughout this specification, unless the context requires otherwise, the word "comprise", or variations such as "comprises" or "comprising", will be understood to imply the inclusion of a stated integer or group of integers but not the exclusion of any other integer or group of integers.

BRIEF DESCRIPTION OF THE INVENTION

In accordance with the present invention, there is provided an improved gear system characterized by at least one gear-wheel provided about a shaft, the shaft and the or each gear-wheel being provided with means for actuable engagement therebetween in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevents such from counter rotating relative to the shaft.

In one form of the invention, the means for actuable engagement is provided in the form of at least one pair of pawl members comprising forward and reverse pawl members provided in the shaft or in the or each gear-wheel, wherein the forward pawl member is adapted to engage a leading surface of a substantially complimentary recess in an opposed surface positively during rotation of that opposed surface with respect to the pawl member, and the reverse pawl member is adapted to engage a trailing surface of a substantially complimentary recess in an opposed surface positively during rotation of that opposed surface with respect to the pawl member.

Preferably, the forward and reverse pawl members are caused to engage the complimentary recesses at least in part by magnetic means.

The magnetic means may include a roving magnet provided within the shaft such that the or each pawl member is magnetised in a manner whereby positioning of the roving magnet directly alongside the pawl members causes those pawls to be repulsed or attracted by the roving magnet and to project into the substantially complimentary recess in the opposed surface.

Preferably, the magnetic means includes a roving electromagnet provided within the shaft, whereby positioning of the roving electromagnet directly alongside the pawl members causes those pawls to be repulsed or attracted by the roving electromagnet (when actuated) and to project into the substantially complimentary recess in the opposed surface.

Preferably still, the roving electromagnet comprises a solenoid.

In a highly preferred form of the present invention, the improved gear system is further characterized by a pair of substantially parallel shafts, each shaft having provided thereabout at least two gear-wheels forming gear-wheel pairs or ratios between the parallel shafts.

In one form of the invention neither of the gear-wheels of a gear-wheel pair or ratio are permanently fixed with respect to its shaft in order to minimise friction losses caused by rotation of all gear-wheel pairs.

In an alternate form of the invention the gear-wheels of a gear-wheel pair or ratio are permanently fixed with respect to one said shaft.

Preferably, each shaft and/or a casing or housing provided about each shaft and the gear wheels located thereabout has provided therein an arrangement or array of electromagnets, the array of electromagnets being positioned so as to allow selective actuation of one or more of the electromagnets to result in selective engagement of chosen gear-wheels with their respective shafts passing therethrough. Preferably still, the array of electromagnets is provided within each shaft.

In a highly preferred form of the invention a programmable logic controller (PLC), microprocessor, computer or engine management system is provided to govern actuation of the array of electromagnets.

In one form of the invention, each shaft may further comprise a plurality of rotating lock rings interposed between a hollow central static shaft through which a roving solenoid assembly may traverse, and a driving/driven rotating shaft having pawl members pivotally mounted thereon, capable of selectively engaging the gear wheels the roving solenoid assembly being adapted to momentarily cease the rotation of one of the plurality of lock rings, which in turn acts on a pawl member and engages or disengages a selected gear wheel. Preferably, each gear wheel has associated therewith four of said rotating lock rings.

Preferably still, pairs of said rotating lock rings comprising said four have associated therewith at least one of said pawl members. Further and still preferably, adjacent pairs of said rotating lock rings have three of said pawl members associated therewith, and arranged circumferentially in equidistant arrangement around the driving/driven shaft.

In one form of the invention, each said gear wheel includes at least one recess having a step formed therein for engagement with a leading edge of said pawl members, to lock the gear wheel with said driving/driven shaft.

Preferably, one of said pairs of said rotating lock rings have associated therewith pawl members aligned in a forward direction and the other of said pairs of said rotating lock rings have associated therewith pawl members aligned in a reverse orientation.

The improved gear system of the present invention provides a method in which it is possible to lock and unlock gears under load with minimal wear, damage, delays or shock loads therein. This is achieved in both up and down gear changes in the same gear system. The construction of the improved gear system of the present invention results in no clutch being required for the majority of its operation and accordingly a gear box utilising the improved gear system of the present invention is ideal for cars, bicycles, motor cycles and the like. However, in some applications, it is envisaged that a clutch may still be required, for example when moving off from rest.

For bicycles, the gear system of the present invention can be incorporated into a chainless drive shaft between the crank and the rear wheel. The system may be fitted with a dual rear bevel gear and a dual direction rear wheel ratchet/roller clutch to provide power during back pedalling. This arrangement allows step pedalling and allows the rider to power forwards by alternately shifting his weight from one foot to the other whilst standing up on the pedals of the bicycle. This arrangement allows power to be maintained whilst the rider is negotiating rough or otherwise difficult terrain. Alternatively, the gear system may be provided with a rear foot brake.

An actuator, for example a roving magnet, is utilised in one form of the present invention to lock and unlock gear-wheels, for example the roving magnet and a cable associated therewith is duplicated in each shaft. This basic arrangement is shown in International Patent Application PCT/AU97/00024 (WO 97/26468). However, in that arrangement one gear-wheel of each gear-wheel pair was fixed with respect to its shaft. In the improved gear system of the present invention the actuators may lock both gear-wheels of a gear-wheal pair or ratio in one meshed set simultaneously. As the next gear is selected by a user the next meshed gear-wheel pair or ratio will lock with respect to the shafts passing therethrough, This will subsequently cause an instance in which four gear-wheels (two gear-wheel pairs) are locked simultaneously. The differing gear ratios between the substantially parallel shafts cannot be maintained during rotation as the slower gear-wheel on each shaft will rotate backwards relative to that shaft.

However, by unlocking an unloaded means for actuable engagement on the slower gear-wheel on each shaft, the loaded means for actuable engagement thereon will be overdriven and may unlock.

Preferably, the improved gear system of the present invention is further characterized by the pawl members being shaped whereby upon a gear-wheel pair or ratio engaging, the previously engaged and more slowly rotating gear-wheel on the other shaft is caused to disengage from that shaft, the differing gear ratios between the substantially parallel shafts having not been maintained during rotation as the slower gear-wheel on each shaft rotates backwards relative to that shaft.

In an alternate form of the present invention, the means for actuable engagement comprises a roller clutch arrangement whereby engagement between the gear-wheels and the shaft about which they are provided is achieved in both forward and reverse directions.

In accordance with the present invention, there is further provided a method for control of the improved gear system of the present invention, the method being directed towards effecting a change up in gear, and being characterized by the steps of:

calling for a change in gear;

disengaging the means for actuable engagement in the reverse direction from the lower gear;

engaging the means for actuable engagement in the forward direction with the higher gear;

disengaging the means for actuable engagement in the forward direction from the lower gear or at least allowing the means for actuable engagement to disengage therefrom of their own accord; and engaging the means for actuable engagement in the reverse direction with higher gear.

In accordance with the present invention, there is further provided a method for control of the improved gear system of the present invention, the method being directed towards effecting a change down in gear under deceleration or overrun, and being characterized by the steps of:

calling for a change in gear;

disengaging the means for actuable engagement in the forward direction from the higher gear;

engaging the means for actuable engagement in the reverse direction with the lower gear;

disengaging the means for actuable engagement in the reverse direction from higher gear or at least allowing the means for actuable engagement in the reverse direction to disengage therefrom of their own accord; and engaging the means for actuable engagement in the forward direction with the lower gear.

In accordance with the present invention, there is further provided a method for control of the improved gear system of the present invention, the method being directed towards effecting a change down in gear under acceleration and being characterized by the steps of:

calling for a change in gear;

disengaging the means for actuable engagement in the reverse direction from the higher gear while momentarily cutting the power to the gear system, for example by means of a clutch or control of engine sparking or cutting the fuel supply or other means of torque modulation;

disengaging the means for actuable engagement in the forward and reverse directions from the higher gear;

increasing the engine speed; and engaging the means for actuable engagement in the forward and reverse directions with the lower gear.

Preferably, where the means for actuable engagement is provided in the form of forward and reverse pawls, the method for changing down a gear under deceleration or overrun is characterized by the steps of:

calling for a change in gear;

disengaging the forward pawls of the higher gear;

engaging the reverse pawls of the lower gear;

disengaging the reverse pawls of the higher gear or at least allowing the forward pawls of the higher gear to disengage on their own accord; and engaging the forward pawls of the lower gear.

Preferably, where the means for actuable engagement is provided in the form of forward and reverse pawls the method for changing up a gear is further characterized by the steps of:

calling for a change in gear;

disengaging the reverse pawls of the lower gear;

engaging the forward pawls of the higher gear;

disengaging the forward pawls of the lower gear or at least allowing the forward pawls of the lower gear to disengage on their own accord; and engaging the reverse pawls of the higher gear.

Preferably, where the means for actuable engagement is provided in the form of forward and reverse pawls, the method for changing down a gear under acceleration is further characterized by the steps of:

calling for a change in gear;

disengaging the forward and reverse pawls of the higher gear while momentarily cutting the power to the gear system, for example by means of a clutch or control of engine sparking or cutting fuel or other means of torque modulation;

disengaging the forward and reverse pawls of the higher gear; and increasing the engine speed; and engaging the forward and reverse pawls of the lower gear.

DESCRIPTION OF THE DRAWINGS

The improved gear system of the present invention will now be described, by way of example only, with reference to three embodiments thereof and the accompanying drawings, in which.

DESCRIPTION

Figure 1:
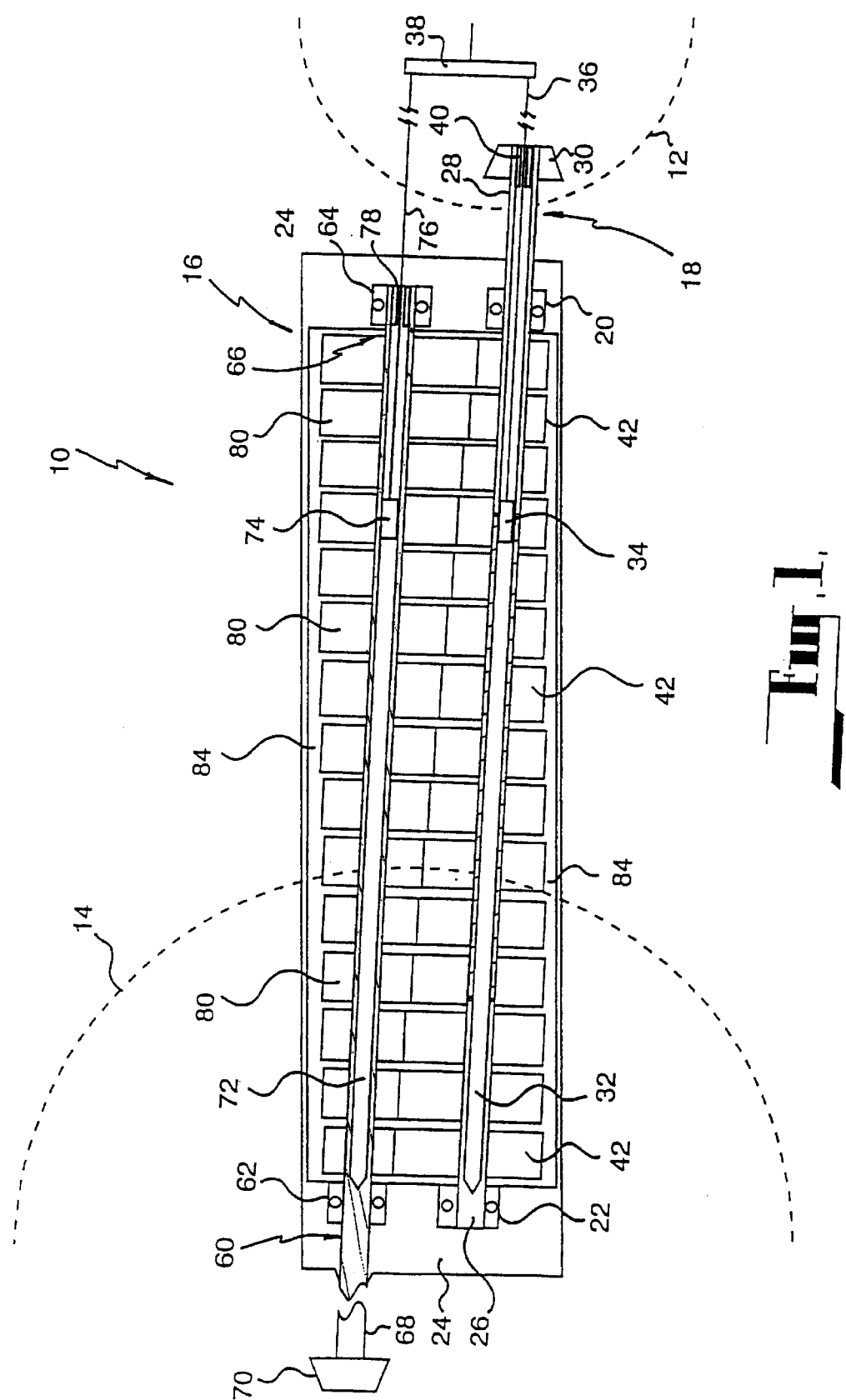
FIG. 1 is a largely diagrammatic cross-sectional view through an improved gear system in accordance with the first embodiment of the present invention, showing the substantially parallel shafts thereof with fifteen gear-wheel pairs or ratios provided thereon and having a casing or housing provided thereabout and shows only in part.

In FIG. 1 there is shown an improved gear system 10 in accordance with the present invention. The gear system 10 is illustrated as attached to a bicycle with a pedal crank shown as 12 and a rear wheel as 14.

The gear system 10 comprises a casing 16, shown in part and in section. A first shaft 18 is mounted in the casing 16 by way of bearing means, for example single row bell bearings 20 and 22. The ball bearings 20 and 22 are rigidly located in end portions 24 of the casing 16. The first shaft 18 has a first end 26 received and held within the ball bearing 22. A free or second end 28 of the shaft 18 has rigidly located thereabout a bevel gear-wheel 30 such that upon rotation of the bevel gear 30 the first shaft 18 also rotates.

The first shaft 15 has a hollow bore 32 blind at the first end 26 of the first shaft 18 but also at the second and 28. A roving magnet 34 is located within the bore 32 in a manner such that it may travel the length thereof and the roving magnet 34 is proportioned accordingly. The roving magnet 34 has a guide cable 36 attached thereto and extends through the bore 32 therefrom and further through the second end 28 of the first shaft 18. The guide cable 36 extends to an index member 38 to which it is rigidly but adjustably connected. An annular bush 40 is provided within the bore 32 adjacent the second end 28 and through which the guide cable 36 extends. The bush 40 acts as a seal and aids in the smooth travel of the guide cable 36, thereby preventing wear of the guide cable 36 and the first shaft 18.

A series of pawl gear-wheels 42 are provided about the first shaft 18 such that these gear-wheels 42 may rotate freely and independently about the shaft 16. However, if required these pawl gear-wheels 42 may be engaged with the first shaft 18, as will be discussed hereinafter.

A second shaft 60 is mounted in the casing 16 by way of bearing means, for example single row ball bearings 62 and 64. The ball bearings 62 and 64 are rigidly located in the end portions 24 of the casing 16 are arranged such that the shafts 18 and 60 are substantially parallel. The second shaft 50 has a first end 66 received and held within the ball bearing 64. A free or second end 68 of the shaft 60 has rigidly located thereabout a bevel gear-wheel 70, such that upon rotation of the second shaft 60 the bevel gear 70 also rotates.

The second shaft 60 has a hollow bore 72 blind at the second end 58 of the second shaft 60 but open at the first end 66. A roving magnet 74 is located within the bore 72 in a manner such that it may travel the length thereof and the roving magnet 74 is proportioned accordingly. The roving magnet 74 has a guide cable 76 attached thereto and extends through the bore 72 therefrom and through the first end 66 of the second shaft 60. The guide cable 76 extends to index member 36 to which It is rigidly but adjustably connected. An annular bush 78 is provided within the bore 72 adjacent the second end 66 and projects through a portion of the end portion 24 of the casing 16. The bush 78 acts as a seal and aids in the smooth travel of the guide cable 76, thereby preventing wear of the guide cable 76 and the second shaft 60.

It is envisaged that the roving magnets 34 and 74 may be provided in the form of neodymium rare earth magnets although such is not considered to limit the scope of the present invention.

A series of pawl gear-wheels 80 are provided about the second shaft 60 such that these gear-wheels 80 may rotate freely and independently about the shaft 18. However, if required these gear-wheels 80 may be engaged with the second shaft 60, as will be discussed hereinafter.

The gear-wheels 42 and 80 are housed within the casing 16 in a chamber 84. The chamber is provided with a volume of lubricant (not shown). The casing 16 is arranged on a bicycle such that the bevel gear-wheel 30 of the first shaft 18 engages a gear-wheel provided on the pedal-crank 12, shown in phantom generally in FIG. 1. Accordingly, drive imparted by a rider (not shown) through the pedal-crank 12 is transferred to the first shaft 18 that is caused to rotate. It is to be understood that the casing 16 preferably covers or encloses the bevel gear-wheels 30 and 70. As such, the casing 16 may have appropriate apertures provided therein to allow access thereinto by the gear-wheels provided on the pedal-crank 12 and the axle.

The gear-wheels 42 provided on the first shaft 18 engage a complimentary gear-wheel 80 on the second shaft 60. In this manner gear-wheel pairs are provided and result in drive from one shaft being transferable to the other shaft. A gear-wheel pair is comprised of two gear-wheels. The relative diameters of the fixed and gear-wheels in a pair determine the gear ratio provided by that gear-wheel pair.

The bevel gear-wheel 70 provided on the second end 68 of the second shaft 60 engages a gear-wheel provided on an axel of the hub of the rear wheel 14 shown in phantom in FIG. 1. In this manner, drive transferred from the first shaft 18 to the second shaft 60 is in turn transferred to the rear wheel 14.

In FIGS. 2 to 6 there are shown a number of gear-wheels 42a, 42b and 42c provided about the first shaft 18. It is to be understood that operation of the gear-wheels 80 is substantially similar. Each gear-wheel 42a, 42b and 42c is able to rotate freely about the first shaft 18 when no pawl member is engaged therewith.

Each gear-wheel has means for actuable engagement provided therein in the form of at least two pairs of pawl members 86 and 88 and retained within the shaft 18. The gear-wheels are retained on a seat 90 and are dimensioned so as to not interfere with rotation of the gear-wheels thereabout. The pawl members 86 and 88 are pivotally located in a recess in the shaft 18, as is best seen in FIG. 3.

The pawl members 86 and 88, for example, may be provided in the form of neodymium rare earth magnets set in a titanium base or casing for added strength, the north and south poles thereof being provided radially with respect to a cross-sectional end view of the first shaft 18. As can be seen with reference to FIGS. 2 to 6 the roving magnet 34 is provided in cylindrical form and has an inner north pole and an outer south pole. A bearing 92 is provided at the point of connection between the guide member 36 and the roving magnet 34 so as to allow the roving magnet 34 to rotate with the shaft 18.

Figure 2:
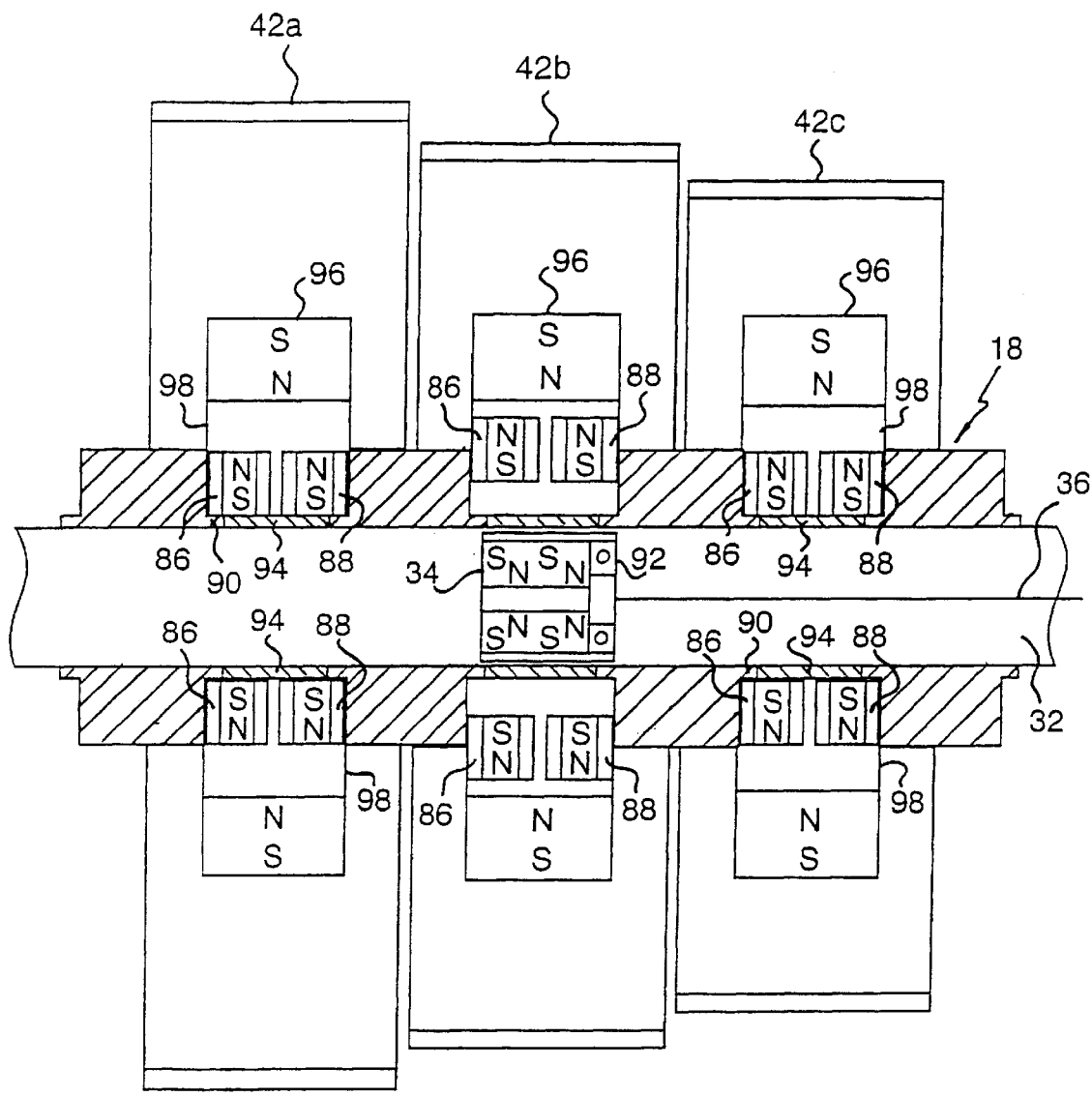
FIG. 2 is a cross-sectional view through a portion of a single shaft of the improved gear system of FIG. 1 and showing the means for actuable engagement and roving magnet thereof.
Figure 3:
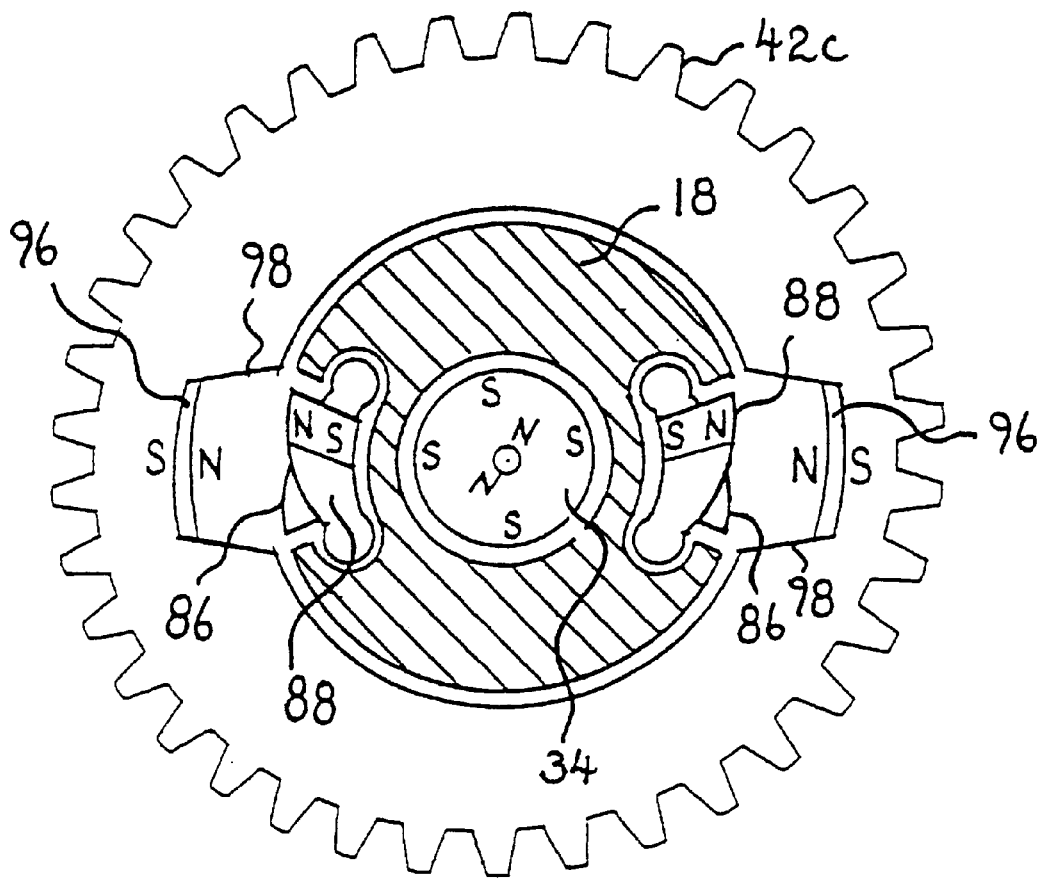
FIG. 3 is a cross-sectional end view through a single shaft and gear-wheel of the improved gear system of FIG. 1.
Figure 7:
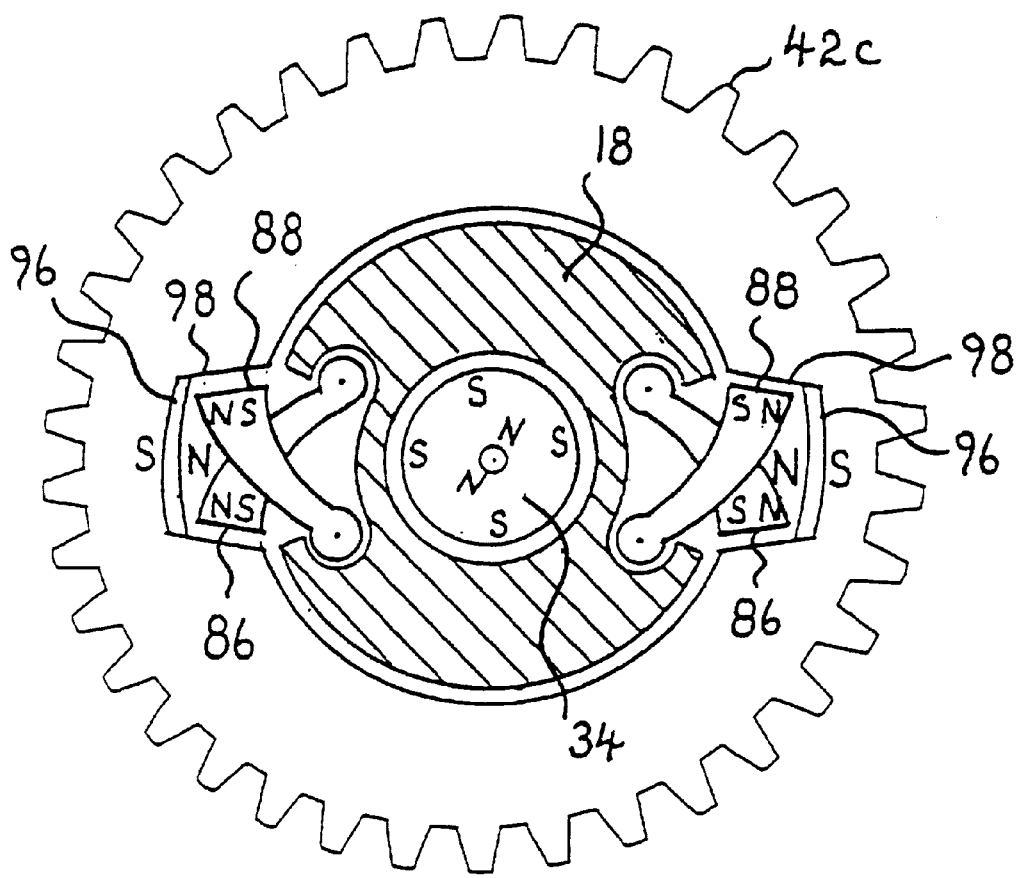
FIG. 7 is a cross-sectional end view in accordance with FIG. 3 showing the pawl members engaging the gear-wheel associated therewith.

The pawls 86 and 88 are arranged "in reverse", with one pawl member being adapted to engage a leading surface relative to the direction of rotation of the shaft, and the other a trailing surface so as to be bi-directionally or counter rotationally lockable, as can best be seen with reference to FIGS. 3 and 7. Magnetic metal rings 94 are provided in the seat 90 of the pawl members 86 and 88 to hold same in the unlocked position, see FIG. 3 and gear-wheel 42a and 42c of FIG. 2. Magnets 96 are provided in the radial extremities of recesses 98 provided in each gear-wheel 42a, 42b and 42c.

In FIG. 2 there is shown the pawl members 86 and 88 adjacent the recess 98 of the gear-wheel 42b engaged therewith. Similarly, the pawl members 86 and 88 adjacent the recess 98 of the gear-wheel 42c are disengaged therefrom, see in this regard FIG. 3. This arrangement is achieved through positioning of the roving magnet 34 adjacent the pawl members 86 and 86 which are in turn adjacent the gear-wheel 42b. The repulsive forces between the roving magnet 34 and the magnets of the pawl members 86 and 88 causing the pawl members 86 and 88 to pivot outwardly and engage the recess 98 of the gear-wheel 42b. As a consequence of this engagement the gear-wheel 42b rotates with the first shaft 18. The complimentary gear-wheel 80 associated with the second shaft 60 would simultaneously be engaged with the shaft 60 through the action of its roving magnet 74 and drive would be transferred between shafts 16 and 60 at the particular gear ratio of the pawl gear-wheel 42b and its corresponding gear-wheel 80.

Figure 4:
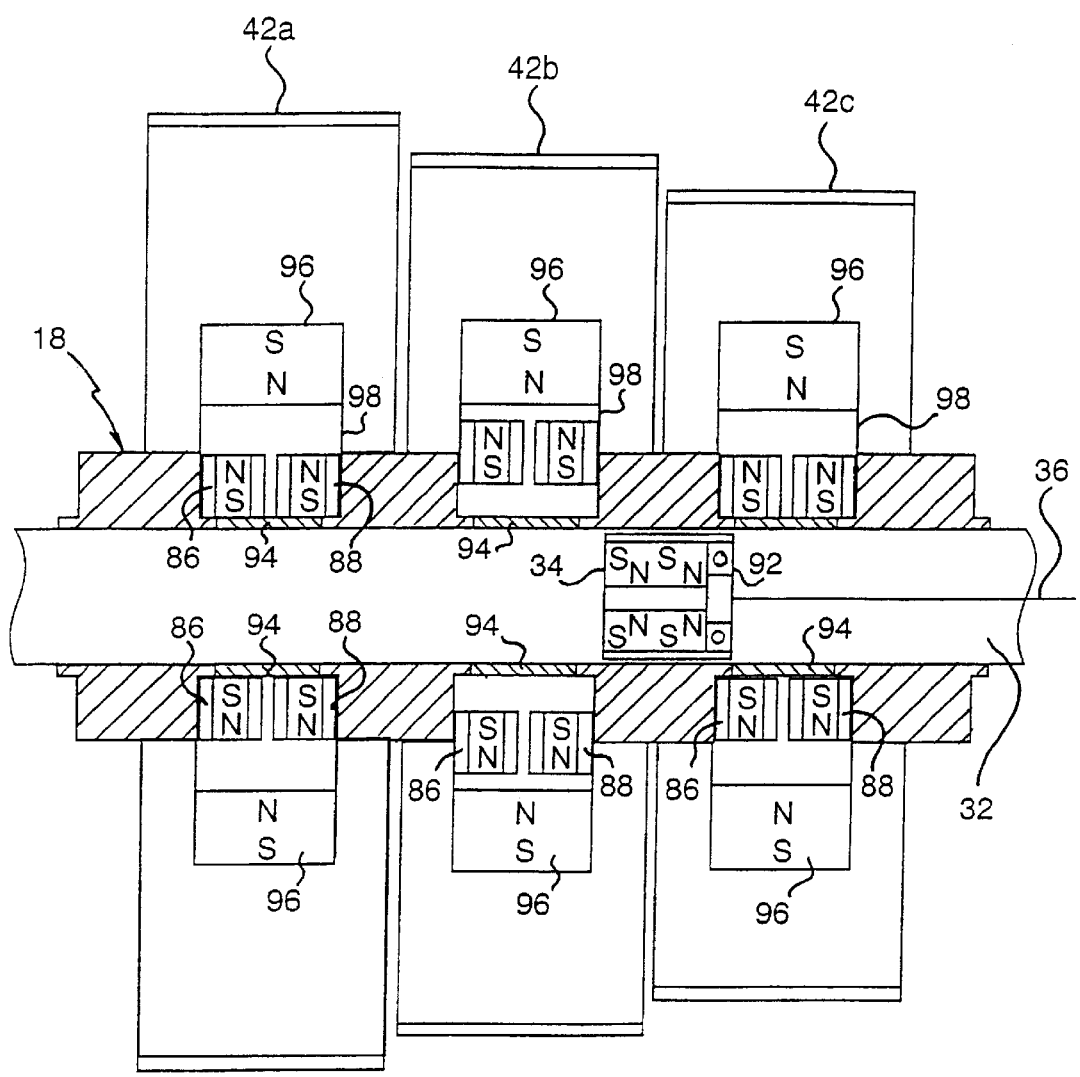
FIG. 4 is a cross-sectional view in accordance with FIG. 2, showing movement of the roving magnet from adjacent one gear-wheel to an adjacent gear-wheel.

In FIG. 4 the roving magnet 34 is shown moved towards the pawl gear-wheel 42c. In effect the roving magnet 34 has moved from a point adjacent the paw members 86 and 88 associated with the pawl gear-wheel 42b to a point intermediate the pawl gear-wheel 42b and the pawl gear-wheel 42c. Importantly, the pawl gear-wheel 42b is still at this point locked with respect to the shaft 18.

Figure 5:
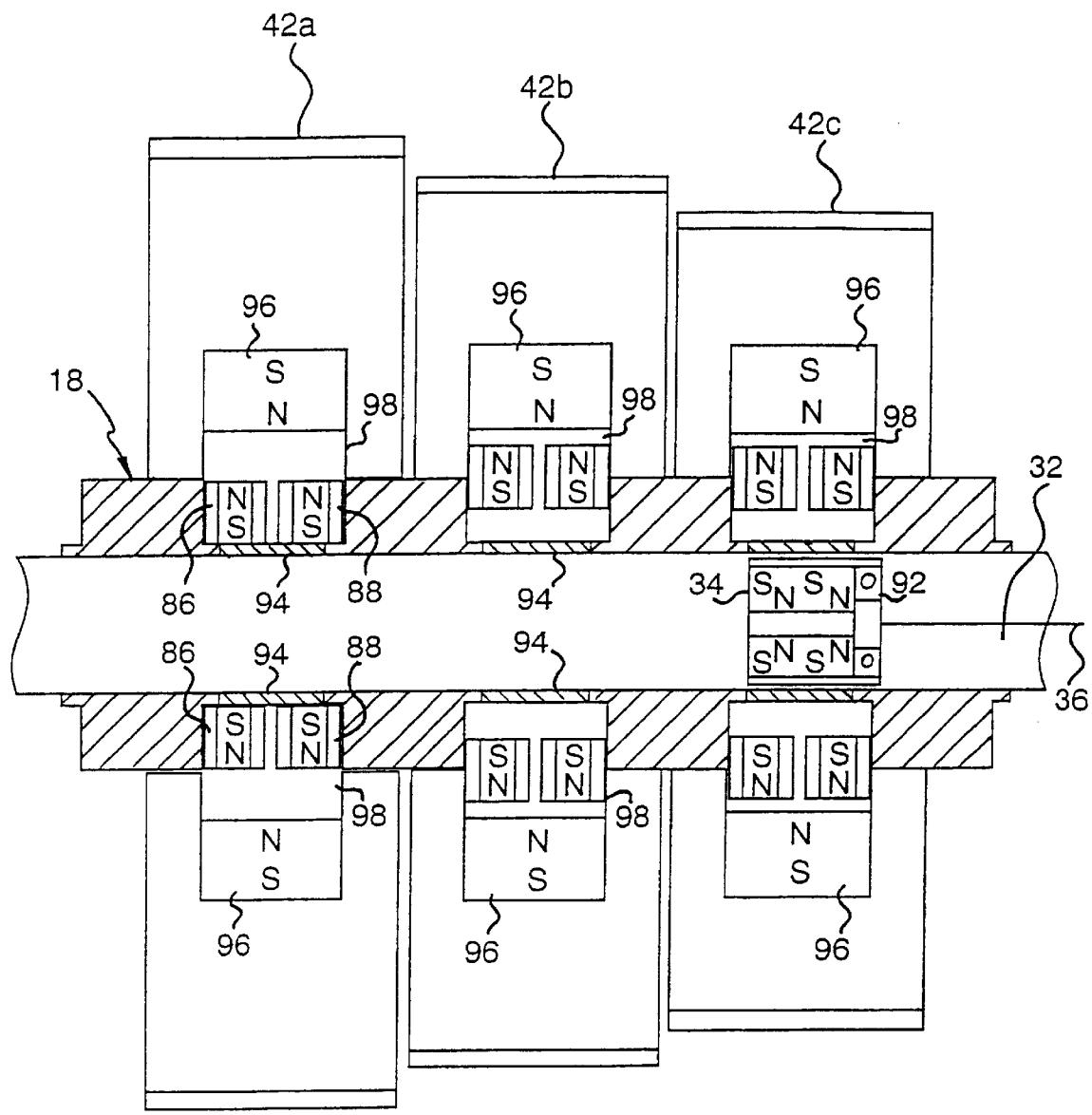
FIG. 5 is a cross-sectional view in accordance with FIGS. 2 and 4, showing the roving magnet positioned alongside the adjacent gear-wheel and the pawl members of the previous gear-wheel still engaging same.

In FIG. 5 the roving magnet 34 is shown aligned directly adjacent the pawl members 86 and 88 associated with the pawl gear-wheel 42c which is shown locked with respect to the shaft 18 whilst the pawl gear-wheel 42b still remains locked with respect to the shaft 18. The configuration shown in FIG. 5 is held only for an instant. As pawl gear-wheel 42c is locked the larger gear of the gear pair formed in part by pawl gear-wheel 42b will rotate backwards in relation to its shaft 18 or 60, thereby causing that larger pawl gear-wheel to unload. This allows the magnets 96 to unlock the pawl members 86 and 88 and which are in turn attracted to the metal strip 94 until the roving magnet 34 may return.

The repulsion between the roving magnet 48 overpowers any attraction between the strip 94 and the pawl members 86 and 88. Similarly, the repulsion between the roving magnet 34 and the pawl members 86 and 88 overpowers the repulsion between the pawl members 86 and 88 and the magnets 96.

Figure 6:
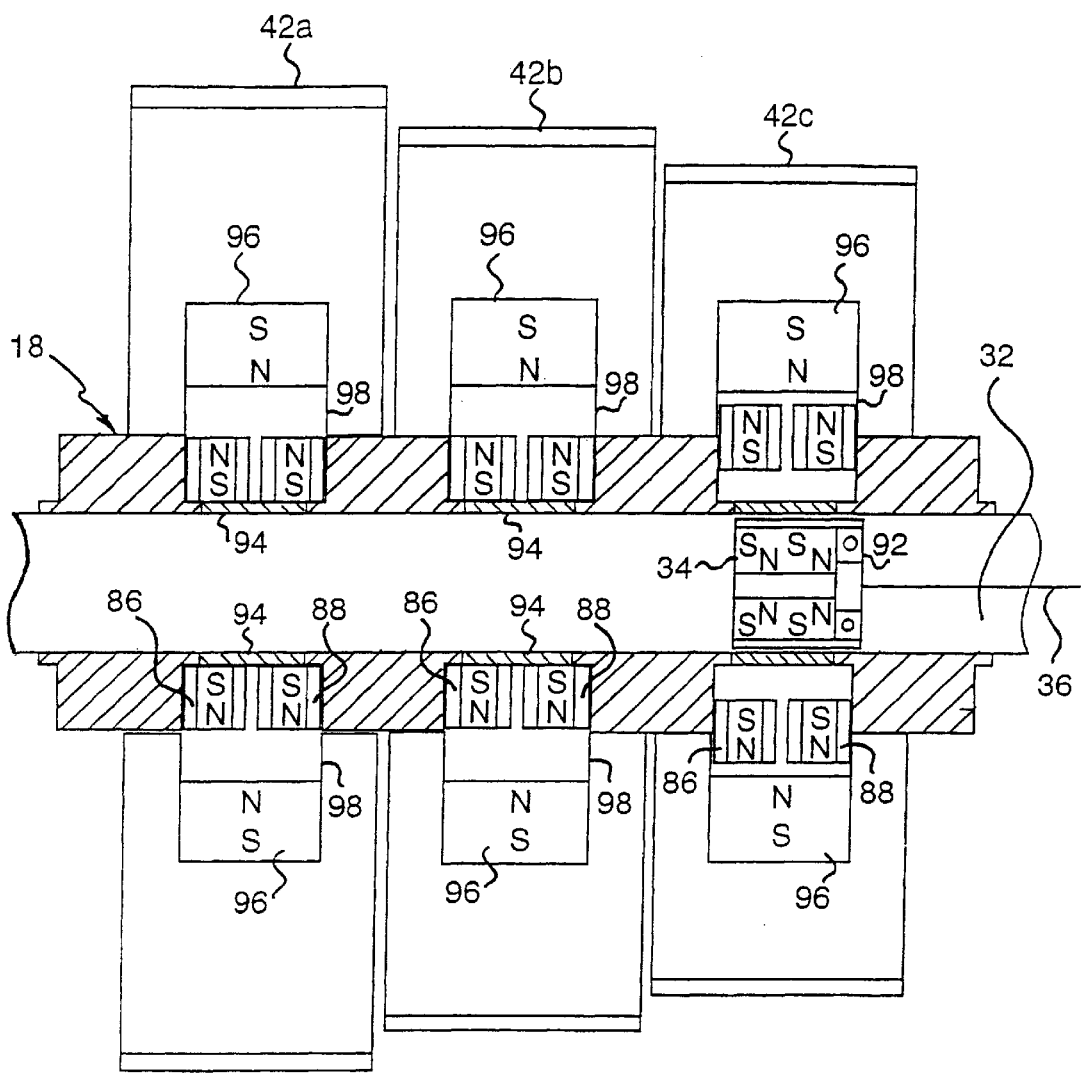
FIG. 6 is a cross-sectional view in accordance with FIGS. 2, 4 and 5, showing the roving magnet positioned alongside the adjacent gear-wheel and in which the pawl members of the previous gear-wheel have returned to within the shaft.

In FIG. 6 there is shown the pawl gear-wheel 42b unlocked from the shaft 18 leaving pawl gear-wheel 42c and its corresponding pawl gear-wheel 80 as the new drive ratio between the shafts 18 and 60. The above described procedure occurs simultaneously on both shafts 18 and 60 as the roving magnets 34 and 70 for move together, as shown in FIG. 1, driven by the guide members 36 and 75.

When a new gear locks, see for example gear-wheal 42c in FIG. 6, the first of the meshed pair (the gear-wheel pair of gear-wheels 42 and 80) to lock is essentially random. When a gear unlocks, see for example gear-wheel 42b in FIGS. 5 and 6, it is the larger gear of the meshed gear-wheel pair that unlocks first. This is due to the larger gear-wheel rotating more slowly relative to the shaft about which it is provided. It is the larger gear-wheel that is unloaded or bears no load. Once one gear-wheel of a meshed pair unlocks, its corresponding gear-wheel or mate on the parallel shaft will be unloaded and will unlock also.

It is envisaged that the means for actuable engagement may comprise a roller clutch arrangement whereby engagement between the gear-wheels and the shaft about which they are provided is achieved in both forward and reverse directions.

Figure 8:
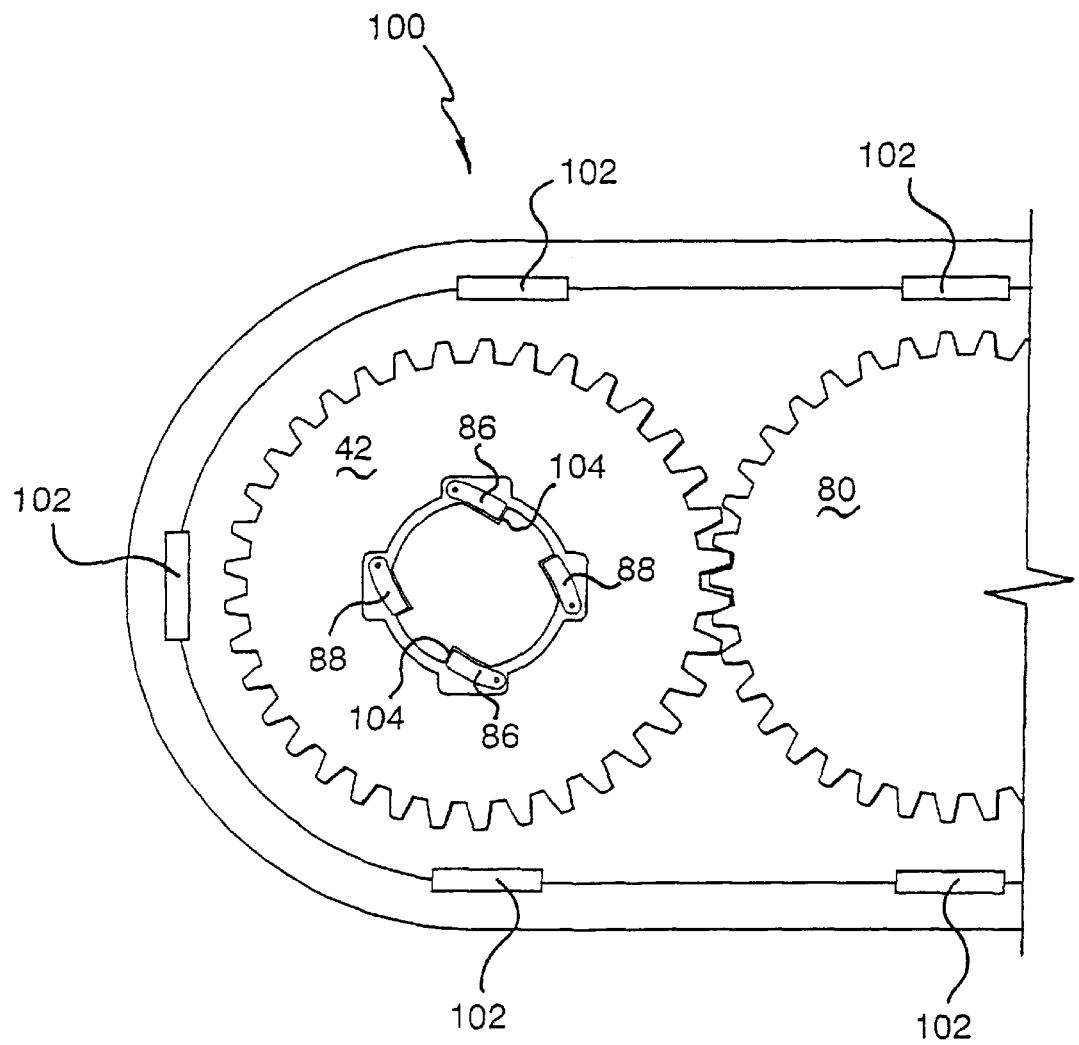
FIG. 8 is a cross-sectional end view through an improved gear system in accordance with a second embodiment of the present invention, showing pawl members housed in the gear-wheel in engagement with complimentary recesses in the surface of the shaft. A portion of an array of electromagnets is also shown in the housing or casing of the improved gear system.

In FIG. 8 there is shown an improved gear system 100 in accordance with a second embodiment of the present invention. The improved gear system 100 is substantially similar to the improved gear system 10 hereinbefore described although importantly the roving magnets 34 and 70 for of the Improved gear system 10 are replaced by an array of electromagnets 102 and the pawl members are provided in the gears 42 and 80 whereby they pivot inwardly to engage the shafts 18 and 60. Consequent changes are expected to be required in the form of the casing 16 to accommodate the array of electromagnets 102. Further, the shafts 18 and 60 may be provided without any bore therein, thereby improving the strength thereof.

In FIG. 8 the gear-wheel 42 is shown in a locked or engaged state with respect to the shaft 18. In this position the electromagnets 102 have influenced magnetically the pawl members 86 and 88 to pivot inwardly from the recessed position within the gear-wheel 42 to engage complimentary recesses 104 provided in the shaft 18. A similar arrangement is provided in respect of the gear-wheel 80 and its corresponding shaft 60.

Importantly, the pawl members 86 and 88 are arranged in the bi-directional manner similar to that of the improved gear system 10 although they need not similar be provided in pairs but may be provided individually as shown in FIG. 8. The method of operation with regard to the changing of gears or gear ratios is substantially the same as that detailed herein previously for the improved gear system 10 although it should be noted that the casing 16 for the improved gear system 100 has provided on an inner surface or adjacent an inner surface thereof an array of electromagnets 102 for each meshed pair of gear-wheels 42 and 80.

It is envisaged that the array of electromagnets 102 may be inturn connected to some form of programmable logic controller (PLC), computer or engine management system whereby such will co-ordinate the actuation of the array of electromagnets 102 so as to govern gear selection and changes.

The bi-directional or "reverse" nature of the pawl members 86 and 88 in both improved gear systems 10 and 100 provides a form of ratchet action whereby the pawl members automatically unlock the lower gear upon the engaging of a higher gear. A second set of pawl members oriented counter rotational to the first mentioned set of pawl members will allow a gear box utilising the improved gear system of the present invention to change down while using that gear box as a brake.

In such an instance, the lower gear will overload the taller gear allowing a down change to take place without load interruption or the use of a clutch.

For down changes in which the gear box is not being used as a brake the power may be temporarily unloaded either with a clutch or a reduction in power to the gear box. The reduction in power to the gear box allows the gear to unlock and allows a new gear to be engaged. Such a temporary unloading of the power to the gear box may be achieved by way of the PLC, computer or engine management system noted hereinabove. Further, such may be achieved by a switch or deceleration also, it is envisaged that there are applications for such an arrangement in industrial gear boxes to provide an intermediate soft start gear or variable speed drives without the need for a clutch. Still further, automotive gear boxes incorporating the improved gear systems of the present invention may change gear smoothly without any power interruption whilst illuminating the readily apparent inefficiencies of conventional or prior art automatic gear boxes.

Figure 9:
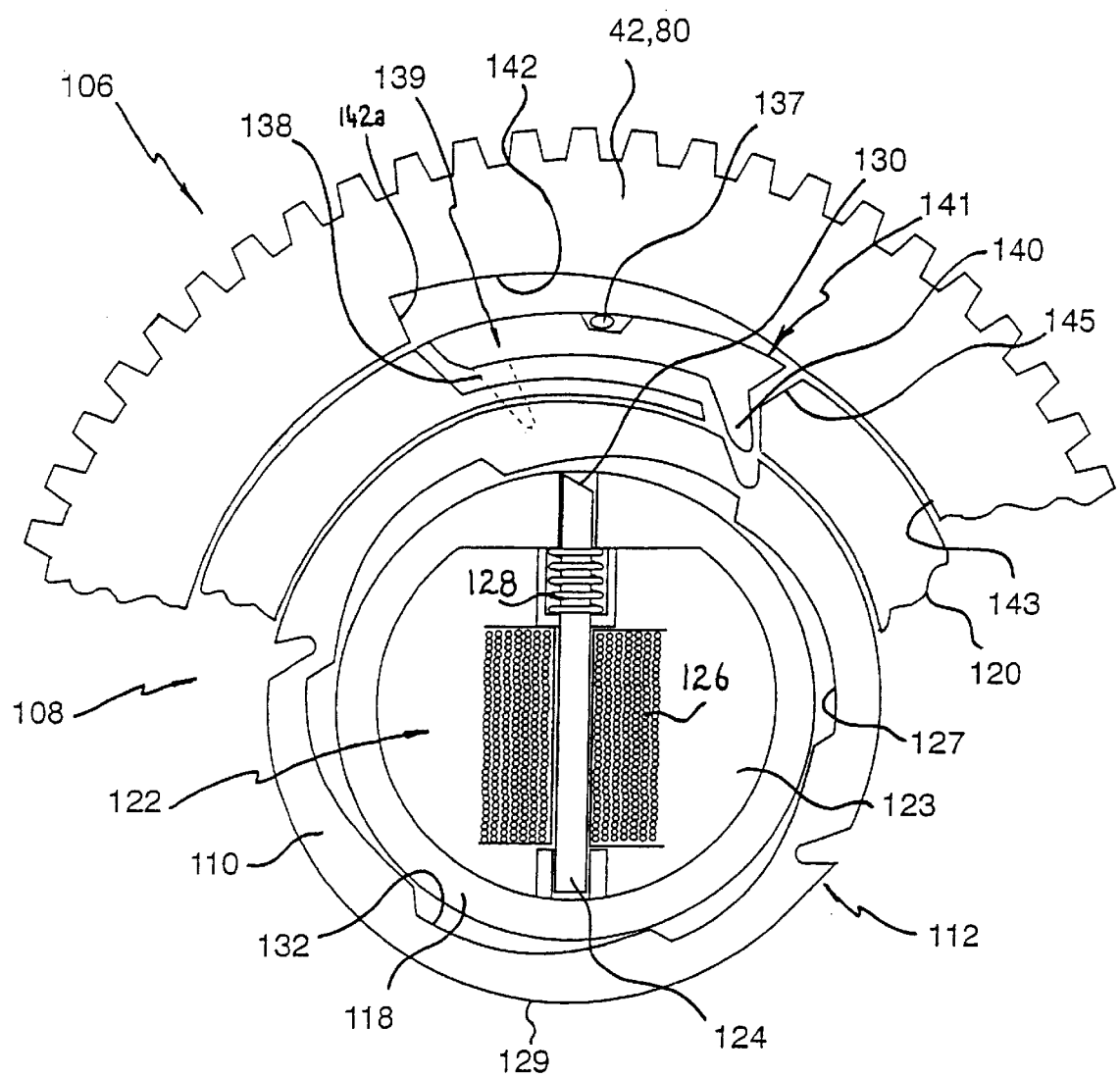
FIG. 9 is a cross sectional end view of a shaft of an improved gear system in accordance with a third embodiment of the present invention. showing a static hollow shaft in which is provided a roving electromagnet, one of a number of rotating lock rings positioned thereabout, a portion of a driving/driven rotating shaft having a pawl member mounted thereon, and a portion of a gear wheel, the pawl member being disengaged from the gear wheel.
Figure 10:
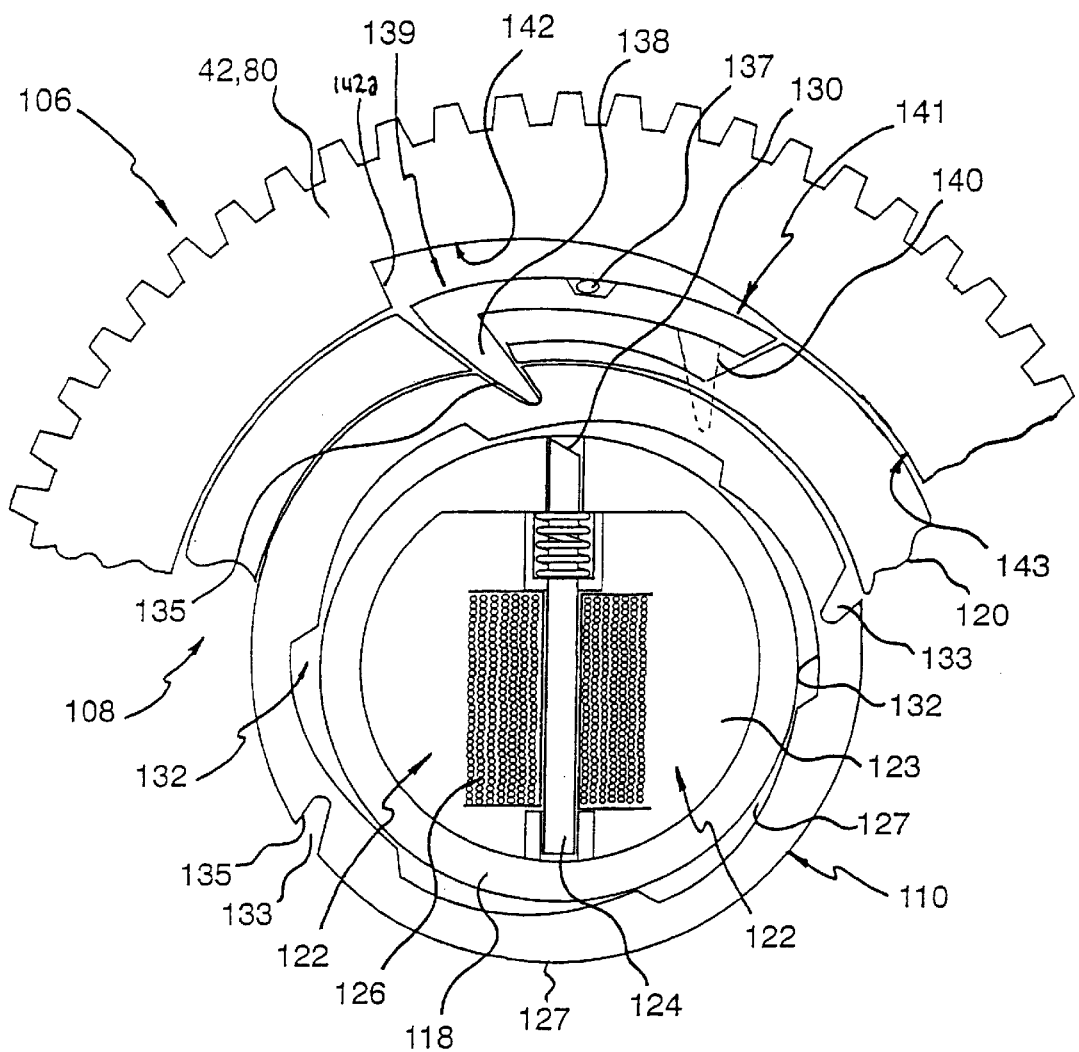
FIG. 10 is a further cross-sectional view of the improved gear system of FIG. 9 showing a static hollow shaft in which is provided a roving electromagnet, a further rotating lock ring positioned thereabout, a portion of a driving/driven rotating shaft having a pawl member mounted thereon, and a portion of a gear wheel, the pawl member being engaged with the gear wheel such that said gear wheel rotates in accordance with the rotation of the driving/driven rotating shaft.
Figure 11:
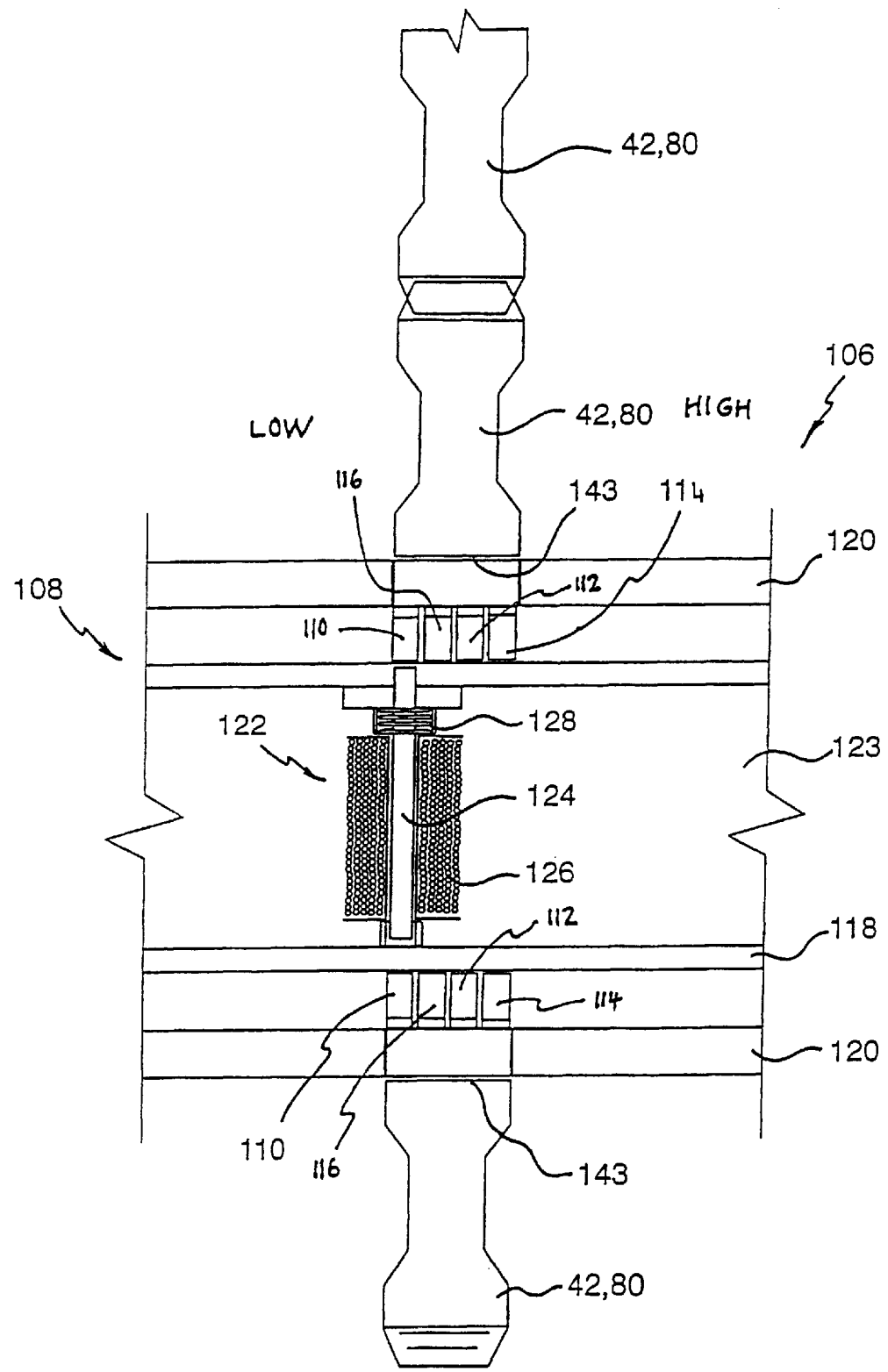
FIG. 11 is a cross sectional side view of a shaft and single pair of gear wheels of the improved gear system of FIGS. 9 and 10, showing in particular the static hollow shaft and the arrangement of four rotating lack rings thereabout, in association with each gear wheel.

In FIGS. 9 to 11 there is shown an improved gear system 106 in accordance with a third embodiment of the present invention. The improved gear system 106 is substantially similar to the improved gear system 10 hereinbefore described, although importantly the first and second shafts 18 and 60 are each replaced with a shaft assembly 108. The shaft assembly 108 has a number of rotating lock rings 110, 112, 114 and 116 corresponding to 4 per gear wheel 42 or 80 mounted on the shaft assembly 108, interposed between a hollow central static shaft 18 and a driving/driven shaft 120. The driving/driven shaft 120 in this embodiment corresponds to the first and second shafts 18 and 60 in the first embodiment of the present invention, the first shaft 18 being a driving shaft and the second shaft 60 being a driven shaft in the first embodiment. For the purposes of the following description, the application of power to the driving/driven shaft 120 causes it to rotate in a counterclockwise direction.

The improved gear system further comprises a magnetic means in the from of a roving solenoid assembly 122 arranged for axial movement within an axial bore 123 provided in the central static shaft 118. The roving solenoid assembly 122 in turn has an actuating pin 124, made of magnetically susceptible material, contained within an electromagnet assembly comprising a wound copper coil and former assembly 126. The actuating pin 124 is retained in a retracted position, shown particularly in FIGS. 9 and 10, by a return spring 128.

Provided along the length of the central static shaft 118 is an elongate axial aperture 130 through which the actuating pin 124 of the roving solenoid assembly 122 may project. An inner surface 127 of each of the rotating lock rings 110, 112, 114 and 116 have provided therein several arcuate recesses 132, each of which has a stop 132a. Each arcuate recess 132 is capable of receiving the actuating pin 124 of the roving solenoid assembly 122, the stop 132a being provided to interfere with the actuating pin 124. The outer surface 129 of each of the rotating locking rings 110, 112, 114 and 116 have similarly provided thereon several further recesses 133, each of said further recesses 133 being configured such as to include a ramp portion 135.

Provided within the driving/driven shaft 120 and spaced equidistantly about the circumference thereof are several pawl members 134. Importantly, the pawl members 134 are arranged in a bi-directional or "reverse" manner similar to that of the improved gear system 10, although they need not be similarly provided in pairs and may be provided individually. Preferably, pawl members of forward orientation 134 are alternated with those of reverse orientation 134a about the circumference of the driving/driven shaft 120. Preferably, there are provided three pawl members 134 of each orientation about the rotating shaft 120.

The pawl members 134 and 134a are pivotally attached to the rotating shaft 120 by means of hinge bar arrangements 137 integral with the rotating shaft 120, and are dimensioned so as not to routinely interfere with rotation of the gear wheels 42 or 80 thereabout. The attachment of the pawl members 134 and 134a by means of the hinge bar arrangement 137 is such that some sliding lateral (circumferential) movement of the pawl member 134 or 134a is permitted, in addition to the pivoting motion of the pawl members 134 and 134a about the hinge arrangements 137.

Figure 12:
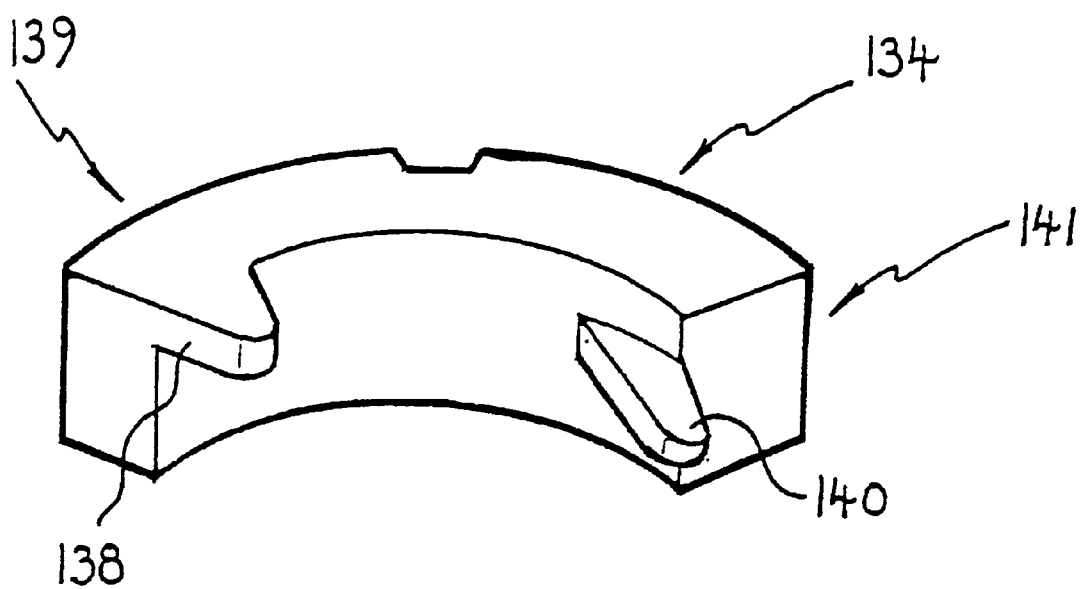
FIG. 12 is a perspective view of a pawl member of the improved gear system of FIG. 9, showing in particular the arrangement of first and second projections thereon.

Each pawl member 134 or 134a is provided with first and second projections 138 and 140 located about first and second ends 139 and 141 thereof. Neither projection 138 and 140 extends across the width of the pawl member 134, the projections being configured in an offset manner such that the first projection 138 is axially displaced relative to the second projection 140, there being no axial overlap therebetween as can best be seen in FIG. 12. Further, the first and second projections 138 and 140 of a pawl member of forward orientation 134 occupy different axial positions to those projections of a pawl member 134a of reverse orientation. Each of the first and second projections 138 and 140 of pawl members 134 of forward and reverse orientations being configured to correspond to one of the four rotating lock rings 110, 112, 114 and 116 associated with each gear wheel 42 or 50 as can best be seen in FIG. 11.

The number of recesses 133 in the outer surfaces 129 of each of the rotating locking rings 110, 112, 114 and 116 corresponds to the number of pawl members 134 whose first or second projections 138 or 140 are adopted to engage therewith, and allows simultaneous engagement thereof. There are three recesses 133 in the outer surfaces 129 of each of the rotating lock rings 110, 112, 114 and 116. Each pair of alternate rotating lock rings 110 and 112 have associated therewith three pawl members 134 of forward orientation. These pawl members 134 are spaced equally circumferentially around the driving/driven shaft 120, and located by hinge bar arrangements 137 as hereinbefore described.

Each pair of alternate rotating lock rings 114 and 116 have associated therewith three pawl members 134a of reverse orientation, mounted to the driving/driven shaft 120 also in equally spaced circumferential arrangement as hereinbefore described. The pawl members 134a or reverse orientation are substantially identical to those of forward orientation 134, although the orientation of the bar hinge arrangement 137 in which they are contained is circumferentially reversed. Similarly the pair of alternate rotating locking rings 114 and 116 positioned so as to engage with the pawl members of reverse orientation 134a are identical to the pair of adjacent rotating look rings 110 and 112.

For a disengaged gear wheel 42 or 80 which is rotating independently of the driving/driven shaft 120, the pawl members of both forward and reverse orientation 134 and 134a are positioned so as not to interfere with the rotation of the gear wheels 42 or 80. The first projections 138 of the pawl members of forward orientation 134 received by the recesses 133 in the outer surfaces 129 of the corresponding rotating lock ring 110, causing the rotating lock ring to rotate in conjunction with the drive/driven shaft 120. The pawl members as can best be seen in FIG. 10.

Application of a current through the electromagnet in the roving solenoid assembly 122 causes the actuating pin 124 to be displaced through the aperture 130 in the central static shaft 118, and engage one of the several stops 132a of the arcuate recesses 132 in a rotating lock rings 110, depending upon the position of the roving solenoid assembly 122 in the cavity 123 in the central static shaft 118.

Referring to FIG. 10 the actuating pin 124 causes a momentary retardation in the rotation of the rotating lock ring 110, whilst the rotating motion of the driving/driven shaft is unaffected. Thus, the ramp portions 135 at the further recesses 133 in the outer surface 129 of the rotating lock ring 110, are forced against the first projections 138 of the pawl members 134, causing the first ends 139 of the pawl members of forward orientation 134 to pivot radially outward about the hinge bars 137, thereby causing each of the first ends 139 of the pawl members 134 to interfere with and engage with one of several complimentary arcuate recesses 142 provided in the inner surface 143 of each gear wheel 42 or 80. The application of the current through the electromagnet in the roving solenoid assembly 122 bis controlled by a synchronisation means (not shown) by which the timing of the application of the current is such that the actuating pin 124 is never forced into contact with one of the several stops 132a of the arcuate recesses 132 in the rotating lock rings 110, 112, 114 and 116.

Further, the application of the current through the electromagnet of the roving solenoid assembly 122 is timed such that the first ends 139 of the pawl members of forward configuration 134, and the second ends 141 of the pawl members of reverse configuration 134a do not contact the angular surfaces 142a of the complimentary arcuate recesses 142, provided in the inner surfaces 143 of each gear wheel 42 or 80.

In this condition, the first projections 138 of the pawl members 134 no longer fully engage in the further recesses 133 in the outer surface 129 of the rotating lock ring 110, and consequently the rotating lock ring 110 is now capable of partial rotation independently of the driving/driven shaft 120.

In addition to the pivotal motion of the pawl members of forward orientation 134 about the hinge bars 137 hereinbefore described, the pawl members 134 move laterally about the hinge bars 137, in the direction of their first ends 139, thereby enhancing centrifugal forces which act to maintain the first ends 139 in engagement with the complimentary recesses 142 provided in the inner surfaces 143 of the gear wheels 42 or 80.

As a result of the pivoting motion and lateral motions of the pawl members of forward orientation 134 about the hinge bars 137 hereinbefore described, the second projections 140 of the pawl members 134 engage with the further recesses 133 in the outer surface of the adjacent rotating lock ring 112 thereby causing the adjacent rotating lock ring 112 to rotate completely in conjunction with the driving I driven shaft 120.

Disengagement of a gear wheel 42 or 8c from the driving/driven shaft 120 is achieved by positioning of the roving solenoid assembly 122 within the cavity 123 of the central static shaft 118 such that the actuating pin 124 thereof is aligned with one of the rotating lock rings 112 which corresponds to the second projections 140 of the pawl members of forward orientation 134.

Application of a current through the roving solenoid assembly 122 causes the actuating pin 124 to be momentarily displaced through the aperture 130 in the central static shaft 118, and engage one of the several stops 132a in the arcuate recesses 132 in the corresponding rotating lock ring 112 causing a momentary retardation in the rotation thereof, whilst the rotating motion of the driving/driven shaft is unaffected.

Thus, the second projections 140 of the pawl members of forward orientation 134 are momentarily rotationally retarded due to their engagement with the further recesses 133 in the outer surface 129 of the corresponding rotating lock ring 112 whilst the second ends 141 of each of the pawl members 141 are forced against angular surfaces 145 within the driving/driven shaft 120. The action of the angular surfaces 145 on the second ends 141 of the pawl members 134 causes the first ends 139 of said pawl members 134 to move radially inward and disengage from the complimentary recesses 142 provided in the inner surfaces 143 of the gear wheels 42 or 80, whilst the first projections 138 of the pawl members 134 re-engage with the recesses 133 in the outer surface 129 of the corresponding rotating lock ring 110 causing said rotating lock ring 110 to rotate in conjunction with the driving/driven shaft 120 as herein before described.

The lateral motion of the pawl members 134 about the hinge bars 137 hereinbefore described significantly facilitates the process of the disengagement of the gear wheels 42 and 80 from the driving/driven shaft 120 hereinbefore described.

Operation of the reverse pawl members 134a in relation to their respective rotating lock rings 114 and 116 proceeds in a similar manner as described above. It will be noted that the sequential arrangement of the rotating lock rings 110, 112, 114 and 116 axially along the central static shaft 118 is such as to facilitate the rapid implementation of the method of the present invention described hereinafter in that to a significant extent adjacent rotating lock rings 110, 112, 114 or 116 can be activated sequentially. For example, when changing up a gear under acceleration, the speed of the change is most important, so the pawl members of forward orientation 134, then the pawl members of reverse orientation 134a of the higher gear should be engaged as rapidly as possible, in that sequence. Thus, the first two rotating lock rings 110 and 116 encountered by the roving solenoid assembly 122 as it moves to a higher gear correspond to the first projection 138 of the pawl members of forward orientation 134 and the second projections of the pawl members of reverse orientation 134a respectively.

It is envisaged that the mechanism whereby the pawl members achieving engagement between the gear-wheel and the shaft about which they are located may be achieved in an axial manner rather than a radial manner as described hereinabove. It is further envisaged that the engine management system used in conjunction with the improved gear system 100 and 106 may unload engine power to allow locking and unlocking with reduced or no load. Further, the engine management system may be electronic and thereby be used to cut power on an electric motor or spark (ignition) on an internal combustion engine. Still further, it is anticipated that there may be benefits associated with an engine management system comprising an automatic mode. Such an automatic mode is expected to require at least a rev sensor and a sensor to determine accelerator position. For example, at 100% peak rpm the engine management automatic load will require an up change of gears. If the accelerator was fully in the off position then a change down will be determined. The engine management system may interrupt power to the gear system of the present invention during acceleration in order to reduce shock and noise. It is envisaged that a standby means of activating the pawl members may be provided for the eventuality of failure of the primary means.

The method for control of the improved gear system of the third embodiment will now be described. The positioning of the roving solenoid assembly 122 is controlled by a stepper motor (not shown) which is under the control of a programmable logic controller (not shown). The programmable logic controllers controls the flow of current to the roving solenoid assembly 122 and thereby controls the activation of the actuating pin 124, and the load on the improved gear system of the third embodiment.

In a situation where a change up in gear is required, either by a user or at the dictation of an engine management system, the programmable logic controller initiates the movement of the roving solenoid assembly 122 through the cavity 123 in the central static shaft 118 by means of the stepper motor to a position such that the actuating pin 124 is aligned with the rotating lock ring of the lower gear 42 or 80 which corresponds to the first projections 138 of the pawl members 134a of reverse orientation. The programmable logic controller then initiates the flow of current through the roving solenoid assembly 122, causing the disengagement of the pawl members 134a of reverse orientation by a mechanism hereinbefore described.

The programmable logic controller then initiates the movement of the roving solenoid assembly 122 by means of the stepper motor to a position such that the actuating pin 124 is aligned with the rotating lock ring of the higher gear 42 or 80 which corresponds to the first projections 138 of the pawl members 134 of forward orientation, and engages the pawl members 134 of forward orientation as hereinbefore described.

The programmable logic controller subsequently initiates the movement of the roving solenoid assembly 122 by means of the stepper motor to a position such that the actuating pin 124 is aligned with the rotating lock ring of the lower gear 42 or 80 which corresponds to the second projections 140 of the pawl members 134 of forward orientation, and disengages the pawl members 134 of forward orientation by a mechanism hereinbefore described, or alternately allows such disengagement to occur spontaneously on the basis of the relative speed of the lower gear wheel to the shaft 120.

Finally, the programmable logic controller initiates the movement of the roving solenoid assembly 122 by means of the stepper motor to a position such that the actuating pin 124 is aligned with the rotating lock ring of the higher gear 42 or 80 which corresponds to the second projections 140 of the pawl members 134a of reverse orientation, and engages the pawl members 134a of reverse orientation by a mechanism hereinbefore described.

Thus, the change in gear ratio is effected without a cessation in the transmission of power from the source to the load.

In a situation where a change down in gear is required with the reverse pawls under load, such as when engine braking, either by a user or at the dictation of an engine management system, the programmable logic controller, initiates the movement of the roving solenoid assembly 122 through the cavity 123 in the central static shaft 118 by means of the stepper motor to a position such that the actuating pin 124 is aligned with the rotating lock ring of the higher gear 42 or 80 which corresponds to the second projections 140 of the pawl members 134 of forward orientation. The programmable logic controller, then initiates the flow of current through the length of conducting material 126, causing the disengagement of the pawl members 134 of forward orientation by a mechanism hereinbefore described.

The programmable logic controller then initiates the movement of the roving solenoid assembly 122 by means of the stepper motor to a position such that the actuating pin 124 is aligned with the rotating lock ring of the lower gear 42 or 80 which corresponds to the second projections 140 of the pawl members 134a of reverse orientation, and engages the pawl members 134a of reverse orientation by a mechanism hereinbefore described.

The programmable logic controller subsequently initiates the movement of the roving solenoid assembly 122 by means of the stepper motor to a position such that the actuating pin 124 is aligned with the rotating lock ring of the higher gear 42 or 80 which corresponds to the first projections 138 of the pawl members 134a of reverse orientation, and disengages the pawl members 134a of reverse orientation by a mechanism hereinbefore described, or alternately allows such disengagement to occur spontaneously on the basis of the relative speed of the lower gear wheel to the shaft 120.

Finally, the programmable logic controller the movement of the roving solenoid assembly 122 by means of the stepper motor to a position such that the actuating pin 124 is aligned with the rotating lock ring of the lower gear 42 or 80 which corresponds to the first projections 140 of the pawl members 134 of forward orientation, and engages the pawl members 134 of forward orientation by a mechanism hereinbefore described.

Thus, the change in gear ratio is again effected without a cessation in the transmission of power from the source to the load.

In a situation where a change down in gear is required with the pawls of forward orientation 134 under load, for example whilst overtaking or travelling uphill, either by a user or at the dictation of an engine management system, the programmable logic controller initiates the movement of the roving solenoid assembly 122 through the cavity 123 in the central static shaft 118 by means of the stepper motor to a position such that the actuating pin 124 is aligned with the rotating lock ring of the higher gear 42 or 80 which corresponds to the first projections 138 of the pawl members 134a of reverse orientation. The programmable logic controller then initiates the flow of current through the roving solenoid assembly 122, causing the disengagement of the pawl members 134a of reverse orientation by a mechanism hereinbefore described.

Simultaneously, the programmable logic controller removes the load on the improved gear system on the present invention, for example, by way of a clutch mechanism or by cutting the spark to an internal combustion engine, then initiates the movement of the roving solenoid assembly 122 through the cavity 123 in the central static shaft 118 by means of the stepper motor to a position such that the actuating pin 124 is aligned with the rotating lock ring of the higher gear 42 or 80 which corresponds to the second projection 138 of the pawl members 134 of forward orientation. The programmable logic controller then initiates the flow of current through the roving solenoid assembly 122, causing the disengagement of the pawl members 134 of forward orientation.

The programmable logic controller then initiates the movement of the roving solenoid assembly 122 by means of the stepper motor to a position such that the actuating pin 124 is aligned with the rotating lock ring of the lower gear 42 or 80 which corresponds to the first projections 140 of the pawl members 134 or 134a of either forward or reverse orientation, and engages such pawl members 134 or 134a, before proceeding to engage the remaining pawl members 134 or 134a of the lower gear 42 or 80 by a mechanism hereinbefore described.

Finally, the programmable logic controller restores load to the improved gear system of the present invention, having achieved the gear change with minimal interruption in the transmission of power from the source to the load.

Modifications and variations such as would be apparent to the skilled addressee are considered to fall within the scope of the present invention.

What is claimed is:

1. An improved gear system characterized by at least one gear-wheel provided about a shaft and the or each gear-wheel being provided with means for actuable engagement there between in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft, disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevent such from counter rotating relative to the shaft;

the means for actuable engagement is provided in the form of at least one pair of pawl members comprising forward and reverse pawl members provided in the shaft or in the or each gear-wheel, wherein the forward pawl member is adapted to engage a leading surface of a substantially complementary recess in an opposed surface positively during rotation of that opposed surface with respect to the pawl member, and the reverse pawl member is adapted to engage a trailing surface of a substantially complementary recess in an opposed surface positively during rotation of that opposed surface with respect to the pawl member;

the forward and reverse bawl members are caused to engage the complementary recesses at least in part by magnetic means.

2. An improved gear system as claimed in claim 1 wherein forward and reverse pawl members are caused to engage the complementary recesses at least in part by magnetic means characterised in that the magnetic means includes a roving magnet provided within the shaft and the or each pawl member is magnetised in a manner whereby positioning of the roving magnet directly alongside the pawl members causes those pawls to be repulsed or attracted by the roving magnet and to project into the substantially complementary recess in the opposed surface.

3. An improved gear system as claimed in claim 1 wherein forward and reverse pawl members are caused to engage the complementary recesses at least in part by magnetic means characterized in that the magnetic means includes a roving electromagnet provided within the shaft, whereby positioning of the roving electromagnet directly alongside the pawl members causes those pawls to be repulsed or attracted by the roving electromagnet, when actuated and to project into the substantially complimentary recess in the opposed surface.

4. An improved gear system as claimed in claim 1 wherein forward and reverse pawl members are caused to engage the complementary recesses at least in part by magnetic means and the magnetic means includes a roving electromagnet provided within the shaft, whereby positioning of the roving electromagnet directly alongside the pawl members causes those pawls to be repulsed or attracted by the roving electromagnet when actuated, and to project into the substantially complementary recess in the opposed surface, characterized in that the roving electromagnet comprises a solenoid.

5. A gear system as claimed in claim 1 further characterized by a pair of substantially parallel shafts, each shaft having provided thereabout at least two gear-wheels forming gear-wheel pairs or ratios between the parallel shafts.

6. A gear system as claimed in claim 1 wherein each shaft and/or a casing or housing provided about each shaft and the gear wheels located thereabout has provided therein an arrangement or array of electromagnets, the array of electromagnets being positioned so as to allow selective actuation of one or more of the electromagnets to result in selective engagement of chosen gear-wheels with their respective shafts passing therethrough.

7. A gear system as claimed in claim 1 wherein each shaft may further comprise a plurality of rotating lock rings interposed between a hollow central static shaft through which a roving solenoid assembly may traverse, and a driving/driven rotating shaft having pawl members pivotally mounted thereon, capable of selectively engaging the gear wheels, the roving solenoid assembly being adapted to momentarily cease the rotation of one of the plurality of lock rings, which in turn acts on a pawl member and engages or disengages a selected gear wheel.

8. A gear system as claimed in claim 1 characterized in that the gear system is incorporated into a chainless drive shaft between the crank and the rear wheel.

9. A gear system as claimed in claim 1 wherein the means for actuable engagement comprises a roller clutch arrangement whereby engagement between the gear-wheels and the shaft about which they are provided is achieved in both forward and reverse directions.

10. A gear system as claimed in claim 5 wherein neither of the gear-wheels of a gear-wheel pair or ratio are permanently fixed with respect to its shaft in order to minimise friction losses caused by rotation of all gear-wheel pairs.

11. A gear system as claimed in claim 5 wherein the gear-wheels of a gear-wheel pair or ratio are permanently fixed with respect to one said shaft.

12. A gear system as claimed in claim 6 wherein said array of electromagnets is provided within each shaft.

13. A gear system as claimed in claim 6 wherein a programmable logic controller (PLC), microprocessor, computer or engine management system is provided to govern actuation of the array of electromagnets.

14. A gear system as claimed in claim 7 characterized in that each gear wheel has associated therewith four of said rotating lock rings.

15. A gear system as claimed in claim 7 wherein each gear wheel has associated therewith four of said rotating lock rings characterized in that pairs of said rotating lock rings comprising said four, have associated therewith at least one of said pawl members.

16. A gear system as claimed in claim 7 wherein each gear wheel has associated therewith four of said rotating lock rings and pairs of said rotating lock rings comprising said four, have associated therewith at least one of said pawl members characterized in that said adjacent pairs of said rotating lock rings have three of said pawl members associated therewith, and arranged circumferentially in equidistant arrangement around said driving/driven shaft.

17. A gear system as claimed in claim 7 wherein each said gear wheel includes at least one recess having a step formed therein for engagement with a leading edge of said pawl members, to lock the gear wheel with said driving/driven shaft.

18. A gear system as claimed in claim 7 wherein each gear wheel has associated therewith four of said rotating lock rings and pairs of said rotating lock rings comprising said four, have associated therewith at least one of said pawl members characterized in that one of said pairs of said rotating lock rings have associated therewith pawl members aligned in a forward direction and the other of said pairs of said rotating lock rings have associated therewith pawl members aligned in a reverse orientation.

19. A gear system according to claim 5 characterized by the pawl members being shaped whereby upon a gear-wheel pair or ratio engaging, the previously engaged and more slowly rotating gear-wheel on the other shaft is caused to disengage from that shaft, the differing gear ratios between the substantially parallel shafts having not been maintained during rotation as the slower gear-wheel on each shaft rotates backwards relative to that shaft.

20. A method for control of a gear system with at least one gear-wheel provided about a shaft and the or each gear-wheel being provided with means for actuable engagement there between in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft, disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevent such from counter rotating relative to the shaft;

the means for actuable engagement is provided in the form of at least one pair of pawl members comprising forward and reverse pawl members provided in the shaft or in the or each gear-wheel, wherein the forward pawl member is adapted to engage a leading surface of a substantially complementary recess in an opposed surface positively during rotation of that opposed surface with respect to the pawl member, and the reverse pawl member is adapted to engage a trailing surface of a substantially complementary recess in an opposed surface positively during rotation of that opposed surface with respect to the pawl member;

the forward and reverse pawl members are caused to engage the complementary recesses at least in part by magnetic means;

the method for control characterized, when changing up a gear, by the steps of:

calling for a change in gear;

disengaging the means for actuable engagement in the forward direction with the higher gear;

engaging the means for actuable engagement in the forward direction with the higher gear;

disengaging the means for actuable engagement in the forward direction from the lower gear or at least allowing the means for actuable engagement to disengage therefrom of their own accord; and engaging the means for actuable engagement in the reverse direction with higher gear.

21. A method for control of a gear system characterized by at least one gear-wheel provided about a shaft and the or each gear-wheel being provided with means for actuable engagement there between in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft, disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevent such from counter rotating relative to the shaft;

the means for actuable engagement is provided in the form of at least one pair of bawl members comprising forward and reverse pawl members provided in the shaft or in the or each gear-wheel, wherein the forward pawl member is adapted to engage a leading surface of a substantially complementary recess in an opposed surface positively during rotation of that opposed surface with respect to the pawl member, and the reverse pawl member is adapted to engage a trailing surface of a substantially complementary recess in an opposed surface positively during rotation of that opposed surface with respect to the pawl member;

the forward and reverse pawl members are caused to engage the complementary recesses at least in part by magnetic means; the method for control being further characterized, when changing down a gear under deceleration or overrun, by the steps of:

calling for a change in gear;

disengaging the means for actuable engagement in the forward direction from the higher gear;

engaging the means for actuable engagement in the reverse direction with the lower gear;

disengaging the means for actuable engagement in the reverse direction from higher gear or at least allowing the means for actuable engagement in the reverse direction to disengage therefrom of their own accord; and engaging the means for actuable engagement in the forward direction with the lower gear.

22. A method for control of a gear system characterized by at least one gear-wheel provided about a shaft and the or each gear-wheel being provided with means for actuable engagement there between in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft, disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevent such from counter rotating relative to the shaft;

the means for actuable engagement is provided in the form of at least one pair of pawl members comprising forward and reverse pawl members provided in the shaft or in the or each gear-wheel, wherein the forward pawl member is adapted to engage a leading surface of a substantially complementary recess in an opposed surface positively during rotation of that opposed surface with respect to the pawl member, and the reverse pawl member is adapted to engage a trailing surface of a substantially complementary recess in an opposed surface positively during rotation of that opposed surface with respect to the pawl member;

the forward and reverse pawl members are caused to engage the complementary recesses at least in part by magnetic means; the method for control being characterized when changing down a gear under acceleration, by the steps of:

calling for a change in gear;

disengaging the means for actuable engagement in the reverse direction from the higher gear while momentarily cutting the power to the gear system, for example by means of a clutch or control of engine sparking or cutting the fuel supply or other means of torque modulation;

disengaging the means for actuable engagement in the forward and reverse directions from the higher gear;

increasing the engine speed; and engaging the means for actuable engagement in the forward and reverse directions with the lower gear.

23. A method for control of a gear system characterized by at least one gear-wheel provided about a shaft and the or each gear-wheel being provided with means for actuable engagement there between in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft, disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevent such from counter rotating relative to the shaft;

the means for actuable engagement is provided in the form of at least one pair of pawl members comprising forward and reverse pawl members provided in the shaft or in the or each gear-wheel, wherein the forward pawl member is adapted to engage a leading surface of a substantially complementary recess in an opposed surface positively during rotation of that opposed surface with respect to the pawl member, and the reverse pawl member is adapted to engage a trailing surface of a substantially complementary recess in an opposed surface positively during rotation of that opposed surface with respect to the pawl member;

the forward and reverse pawl members are caused to engage the complementary recesses at least in part by magnetic means; the method for control being further characterized, when changing down a gear under deceleration or overrun, by the steps of:

calling for a change in gear;

disengaging the forward pawls of the higher gear;

engaging the reverse pawls of the lower gear;

disengaging the reverse pawls of the higher gear or at least allowing the forward pawls of the higher gear to disengage on their own accord; and engaging the forward pawls of the lower gear.

24. A method for control of a gear system characterized by at least one gear-wheel provided about a shaft and the or each gear-wheel being provided with means for actuable engagement there between in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft, disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevent such from counter rotating relative to the shaft;

the means for actuable engagement is provided in the form of at least one pair of pawl members comprising forward and reverse pawl members provided in the shaft or in the or each gear-wheel, wherein the forward pawl member is adapted to engage a leading surface of a substantially complementary recess in an opposed surface positively during rotation of that opposed surface with respect to the pawl member, and the reverse pawl member is adapted to engage a trailing surface of a substantially complementary recess in an opposed surface positively during rotation of that opposed surface with respect to the pawl member;

the forward and reverse pawl members are caused to engage the complementary recesses at least in part by magnetic means; the method for control being characterized, when changing up a gear, by the steps of:

calling for a change in gear;

disengaging the reverse pawls of the lower gear;

engaging the forward pawls of the higher gear;

disengaging the forward pawls of the lower gear or at least allowing the forward pawls of the lower gear to disengage on their own accord; and engaging the reverse pawls of the higher gear.

25. A method for control of a gear system characterized by at least one gear-wheel provided about a shaft and the or each gear-wheel being provided with means for actuable engagement there between in both rotational and counter-rotational directions, such that engagement of the means for actuable engagement of the or each gear wheel in both the rotational and counter-rotational directions causes the or each gear-wheel to rotate in conjunction with the shaft and prevents such from counter-rotating relative to the shaft, disengagement of the means for actuable engagement of the or each gear-wheel in both the rotational and counter-rotational directions allows the or each gear-wheel to rotate independently of the shaft and counter-rotate relative to the shaft, engagement of the means for actual engagement in the rotational direction and disengagement of the means for actual engagement in the counter-rotational direction of the or each gear wheel causes such to rotate in conjunction with the shaft and allows such to counter rotate relative to the shaft, and engagement of the means for actual engagement in the counter-rotational direction and disengagement of the means for actual engagement in the rotational direction of the or each gear wheel allows such to rotate relative to the shaft, but prevent such from counter rotating relative to the shaft;

the means for actuable engagement is provided in the form of at least one pair of pawl members comprising forward and reverse pawl members provided in the shaft or in the or each gear-wheel, wherein the forward pawl member is adapted to engage a leading surface of a substantially complementary recess in an opposed surface positively during rotation of that opposed surface with respect to the pawl member, and the reverse pawl member is adapted to engage a trailing surface of a substantially complementary recess in an opposed surface positively during rotation of that opposed surface with respect to the pawl member;

the forward and reverse pawl members are caused to engage the complementary recesses at least in part by magnetic means; the method for control being characterized, when changing down a gear under acceleration, by the steps of:

calling for a change in gear;

disengaging the reverse pawls of the higher gear while momentarily cutting the power to the gear system, for example by means of a clutch or control of engine sparking or cutting the fuel supply or the means of torque modulation;

disengaging the forward and reverse pawls of the higher gear;

increasing the engine speed; and engaging the forward and reverse pawls of the lower gear.

* * * * *

UNITED STATES PATENT AND TRADEMARK OFFICE
CERTIFICATE OF CORRECTION

PATENT NO. : 6,223,613 B1
DATED : May 1, 2001
INVENTOR(S) : William Wesley Martin It is certified that error appears in the above-identified patent and that said Letters Patent is hereby corrected as shown below:

Title page,
Item [57], ABSTRACT,
Lines 16 and 17, after "engagement" delete [(86, 68)] and insert therein -- (86, 88) --.

Column 1,
Line 14, before "and" delete [lack] and insert therein -- lock --.
Line 21, after "that" delete [sear] and insert therein -- gear --.
Line 33, delete [POT/AU97/-00024] and insert therein -- PCT/AU97/00024 --.

Column 3,
Line 67, after "gear-" delete [wheal] and insert therein -- wheel --.

Column 6,
Line 28, after "invention" delete [.] and insert therein -- , --.
Line 59, after "row" delete [bell] and insert therein -- ball --.
Line 66, after "shaft" delete [15] and insert therein -- 18 --.

Column 7,
Line 15, after "shaft" delete [16] and insert therein -- 18 --.
Line 22, after "shaft" delete [50] and insert therein -- 60 --.
Line 28, after "second end" delete [58] and insert therein -- 68 --.
Line 35, after "member" delete [36] and insert therein -- 38 --.

Column 8,
Line 53, after "and" delete [86] and insert therein -- 88 --.
Line 62, after "shafts" delete [16] and insert therein -- 18 --.
Line 67, after "the" delete [paw] and insert therein -- pawl --.

Column 9,
Line 29, after "and" delete [75] and insert therein -- 76 --.

Column 11,
Line 58, after "or" delete [50] and insert therein -- 80 --.

Column 13,
Line 15, after "driving" delete [I] and insert therein -- / --.
Line 17, after "or" delete [8c] and insert therein -- 80 --.

Column 17,
Line 10, after "reverse" delete [bawl] and insert therein -- pawl --.

UNITED STATES PATENT AND TRADEMARK OFFICE
CERTIFICATE OF CORRECTION

PATENT NO. : 6,223,613 B1
DATED : May 1, 2001
INVENTOR(S) : William Wesley Martin It is certified that error appears in the above-identified patent and that said Letters Patent is hereby corrected as shown below:

Column 19,
Line 67, before "members" delete [bawl] and insert therein -- pawl --.

Signed and Sealed this

Second Day of July, 2002

Attest:

Attesting Officer

JAMES E. ROGAN
Director of the United States Patent and Trademark Office